United States Patent
Wu et al.

(10) Patent No.: US 8,976,787 B2
(45) Date of Patent: Mar. 10, 2015

(54) PROTOCOL BOOSTER FOR SCTP IN MULTICAST NETWORKS

(75) Inventors: Zhenyu Wu, Plainsboro, NJ (US); Dekai Li, Yardley, PA (US)

(73) Assignee: Thomson Licensing, Issy les Moulineaux (FR)

( * ) Notice: Subject to any disclaimer, the term of this patent is extended or adjusted under 35 U.S.C. 154(b) by 77 days.

(21) Appl. No.: 13/514,064

(22) PCT Filed: Dec. 10, 2009

(86) PCT No.: PCT/US2009/006490
§ 371 (c)(1),
(2), (4) Date: Jun. 6, 2012

(87) PCT Pub. No.: WO2011/071474
PCT Pub. Date: Jun. 16, 2011

(65) Prior Publication Data
US 2012/0243459 A1    Sep. 27, 2012

(51) Int. Cl.
H04L 12/18 (2006.01)
H04L 12/28 (2006.01)
H04L 1/16 (2006.01)
H04L 1/00 (2006.01)
H04L 29/08 (2006.01)
H04L 29/06 (2006.01)

(52) U.S. Cl.
CPC ....... H04L 1/1607 (2013.01); *H04L 2001/0093* (2013.01); H04L 12/184 (2013.01); *H04L 29/08045* (2013.01); *H04L 65/1016* (2013.01); H04L 12/1854 (2013.01); H04L 12/189 (2013.01); H04L 12/1836 (2013.01); *H04L 65/4076* (2013.01); *H04L 69/326* (2013.01)
USPC ...................... 370/390; 370/432; 370/395.52

(58) Field of Classification Search
USPC ......................................... 370/390, 312, 432
See application file for complete search history.

(56) References Cited

U.S. PATENT DOCUMENTS

| 6,189,039 B1 | 2/2001 | Harvey et al. |
| 6,724,761 B1 * | 4/2004 | Moy-Yee et al. ............. 370/390 |
| 6,873,659 B2 | 3/2005 | Csomo |

(Continued)

FOREIGN PATENT DOCUMENTS

EP    0902569    9/1998

OTHER PUBLICATIONS

International Search Report.

*Primary Examiner* — Khaled Kassim
*Assistant Examiner* — Zhaohui Yang
(74) *Attorney, Agent, or Firm* — Robert D. Shedd; Jerome G. Schaefer

(57) ABSTRACT

A traffic optimizer facilitates communication of data packets using a unicast protocol between a server and at least one of a plurality of clients through a multicast network. The traffic optimizer includes a communication processor and a packet processor. The communication processor receives both data including association data and the data packets using the unicast protocol from the server. The association data includes IP addresses of the server and IP addresses of at least one of a plurality of clients available for communication. The packet processor processes the data packets to optimize data transfer in response to an analysis of the data packets, and forwards the processed data packets to at least one of the plurality of clients at respective ones of the received IP addresses through a multicast network using the unicast protocol.

15 Claims, 4 Drawing Sheets

(56) References Cited

U.S. PATENT DOCUMENTS

| | | | |
|---|---|---|---|
| 7,620,045 B2* | 11/2009 | Igarashi et al. | 370/390 |
| 2005/0002365 A1 | 1/2005 | Xu | |
| 2005/0021817 A1* | 1/2005 | Shimizu et al. | 709/231 |
| 2005/0188108 A1 | 8/2005 | Carter et al. | |
| 2005/0208942 A1 | 9/2005 | Pekonen et al. | |
| 2006/0193295 A1 | 8/2006 | White et al. | |
| 2006/0218262 A1* | 9/2006 | Abeta et al. | 709/223 |
| 2007/0002858 A1 | 1/2007 | Bichot et al. | |
| 2007/0110074 A1* | 5/2007 | Bradley et al. | 370/395.51 |
| 2007/0110084 A1 | 5/2007 | Bennett | |
| 2009/0154356 A1* | 6/2009 | Wiemann et al. | 370/236 |
| 2010/0043067 A1* | 2/2010 | Varadhan et al. | 726/13 |
| 2011/0085464 A1* | 4/2011 | Nordmark et al. | 370/252 |

* cited by examiner

PROTOCOL BOOSTER FOR SCTP IN MULTICAST NETWORKS

CROSS REFERENCE TO RELATED APPLICATIONS

This application claims the benefit, under 35 U.S.C. §365 of International Application PCT/US2009/006490, filed Dec. 10, 2009, which was published in accordance with PCT Article 21(2) on Jun. 16, 2011 in English.

FIELD

The present arrangement provides multicast support for systems employing the Stream Control Transmission Protocol (SCTP) and the Stream Control Transmission Protocol-Partial Reliability (SCTP-PR) in a multi-link/multi-path networking environment using components outside of standard protocols.

BACKGROUND

SCTP is a reliable transport protocol standardized by the Internet Engineering Task Force (IETF). SCTP supports features such as multistreaming and multihoming as described in IETF RFC 4960, "Stream control transmission protocol" and in an article by S. Fu and M. Atiquzzaman titled "SCTP: state of the art in research, products, and technical challenges," Institute of Electrical and Electronics Engineers (IEEE) Communication Magazine, April 2004. SCTP-PR is an extension of SCTP, which allows an SCTP implementation to provide partially reliable data transmission service to an upper layer protocol.

In an article by F. Yong, W. Chee and S. Ramadass, entitled "M-SCTP: transport layer multicasting protocol," found in National Computer Science Postgraduate Colloquium (NaCSPC), 2005, a scheme that utilizes multicast SCTP (M-SCTP) is described. The scheme adds an M-SCTP server stack between an SCTP server and its SCTP clients. The server stack manages the resources of a multicast service and controls multicast membership. However, the scheme achieves multicast capability by using recursive unicast protocol message transmissions. In other words, multicast is realized by the server stack by duplicating data packets and sending them to each client individually using multiple unicast protocol message transmissions. Thus, the scheme does not solve problems stemming from low bandwidth efficiency or poor system scalability.

A scheme exists for adding multicast support to SCTP. In this scheme, a one-to-many style SCTP socket is opened at the server side that consists of multiple associations. Each association has two endpoints, one at the server and the other at a respective client in a multicast network with unicast capability. Furthermore, each association contains a path corresponding to a multicast network link, and other paths corresponding to unicast network links. The multicast paths in the multiple associations of the SCTP socket share the same multicast IP address as well as the transport port address. The server is thus able to send one copy of the data packets, but be able to reach all of the clients, through multicast. As a result, high bandwidth efficiency can be achieved and a system that employs this scheme would scale well with an increased number of clients in a multicast network.

However, the aforementioned scheme requires that certain changes be made to the protocol. For example, the SCTP protocol must be modified so that on the server side, across multiple associations in a socket, only one copy of data packets is sent over a shared multicast path. In applications where changes to the protocol are restricted, this can prevent the scheme from operating. In addition, due to the shared multicast path, all clients are required to have the same SCTP port address because all clients are to receive the same set of data packets. A client that has an occupied port address may not use the same port address to receive multicast data packets. The present arrangement will allow the aforementioned scheme to operate without explicit changes to SCTP or SCTP-PR protocol.

SUMMARY

A traffic optimizer facilitates communication of data packets using a unicast protocol between a server and at least one of a plurality of clients through a multicast network. The traffic optimizer includes a communication processor and a packet processor. The communication processor receives both data including association data and the data packets using the unicast protocol from the server. The association data includes IP addresses of the server and IP addresses of at least one of a plurality of clients available for communication. The packet processor processes the data packets to optimize data transfer in response to an analysis of the data packets, and forwards the processed data packets to at least one of the plurality of clients at respective ones of the received IP addresses through a multicast network using the unicast protocol.

The unicast protocol may be one of SCTP or SCTP-PR. The apparatus may further include an IP address repository that stores the association data for access by the packet processor to forward the processed data packets.

The apparatus may further include a packet buffer that buffers the received data packets, before the data packets are processed, until an expected number of data packets are received. The apparatus may further include a packet analyzer that analyzes the buffered data packets to determine a type of processing required.

The buffered data packets may be analyzed by determining which data packets are redundant, and the packet processor may process the data packets by removing the data packets that are redundant.

The buffered data packets may further be analyzed by determining which data packets hold the most complete set of data, and the packet processor may process the data packets by compiling a substantially complete set of data packets.

A client may send an acknowledgment to the server indicating proper receipt of data packets from the multicast network and information including whether packets are delayed.

The traffic optimizer may receive instructions from the server to skip transmission of certain data packets to a particular IP address of an association based upon an indication that packets are delayed after a client has received the data packets through the multicast network.

The traffic optimizer may also receive instructions from the server to remove an IP address from an association if it is determined that a particular IP address experiences substantial packet delay after the client has received the data packets through the multicast network.

A method facilitates communication of data packets using a unicast protocol between a server and at least one of a plurality of clients through a multicast network with a traffic optimizer. Both data including association data and the data packets using the unicast protocol are received from the server. The association data includes IP addresses of the server and IP addresses of at least one of a plurality of clients available for communication. The analyzed data packets are processed to optimize data transfer in response to analysis of the data packets. The processed data packets are forwarded to at least one of the plurality of clients at respective ones of the received IP addresses through a multicast network using the unicast protocol.

The method may also include buffering the received data packets until an expected number of data packets are received and analyzing the buffered data packets to determine the type of processing required.

Analyzing may be performed by determining which data packets are redundant, and processing may be performed by removing data packets that are redundant.

Analyzing may also be performed by determining which data packets hold the most complete set of data packets, and processing may be performed by compiling a substantially complete set of data packets.

The method may also include, sending, with a client, an acknowledgment to the server indicating proper receipt of data packets from the multicast network and information including whether data packets are delayed.

The method may include skipping the transmission of certain data packets for a particular IP address of an association based upon an indication that packets are delayed after a client has received the data packets through the multicast network.

The method may also include removing an IP address from an association if it is determined that a particular IP address experiences substantial packet delay after the client has received the data packets through the multicast network.

The unicast protocol of the method may be one of SCTP or SCTP-PR.

Additional features and advantages of the arrangement are apparent from the following detailed description of illustrative embodiments which proceeds with reference to the accompanying figures.

DETAILED DESCRIPTION OF THE EMBODIMENTS

Figure 1:
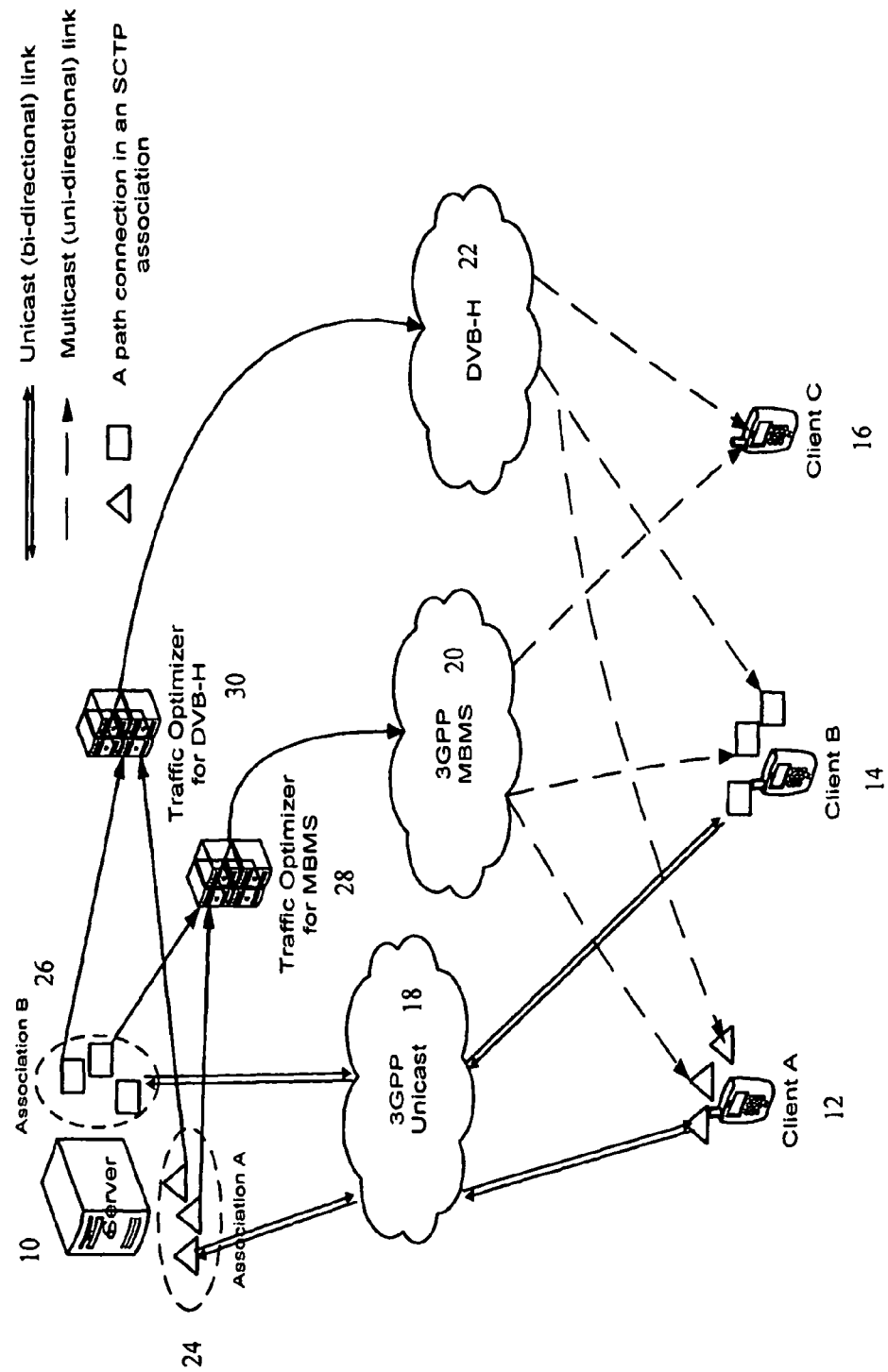
FIG. 1 depicts an example of a system supporting SCTP for concurrent multi-path transmission across both unicast and multicast networks according to the present arrangement.

The present arrangement disclosed herein provides a scheme that enables multicast broadcasts to be applied to systems capable of supporting SCTP, SCTP-PR or TCP. FIG. 1 shows an implementation of a protocol boosting scheme that may be applied to SCTP and SCTP-PR using multicast networks. In FIG. 1, server 10 includes content stored on a storage medium that is selectably deliverable to requesting clients. This content may include data representing an association between server 10 and a client, which is discussed further below, and data packets that are to be sent to certain clients based on a corresponding association. In FIG. 1, unicast links are indicated as a close pair of solid-line links denoting bidirectional communication using a pair of links. The dashed-line unidirectional links indicate a multicast link.

Triangles and squares in FIG. 1 are indicative of an SCTP association. Specifically, triangles represent a SCTP association A and squares represent an SCTP association B. In the particular example of FIG. 1, association A 24 relates to an association between the server 10 and the client A device 12. Association B 26 relates to an association between the server 10 and the client B 14 device.

Exemplary clients are depicted as Clients 12, 14 and 16 in FIG. 1 which represent Clients A, B and C, respectively. Although FIG. 1 depicts three clients, the system is not limited to operation with three clients and may support anywhere from one to a plurality of clients. Each individual client 12, 14 or 16 may include several IP addresses used for exchanging data packets with server 10. The IP addresses of an individual client are used to create communication paths with IP addresses of server 10 to facilitate the exchange of data packets between an individual client and server 10. Server 10 may also form communication paths with individual clients through multiple access networks. For example, as shown in FIG. 1, server 10 can form communication paths with unicast access network 18, and multicast access networks 20 and 22, which correspond to a $3^{rd}$ generation partnership project (3GPP) Unicast network, 3GPP Multimedia Broadcast and Multicast Services MBMS network and Digital Video Broadcasting—Handheld (DVB-H) network, respectively. Although FIG. 1 depicts three access networks, the system is not limited to operation with three access networks and may support connection paths between server 10 and one to a plurality of access networks supporting either unicast of multicast data transmission. Unicast access network 18 provides unicast communication support capability with bi-directional uplinks and downlinks between server 10 and each respective client. Multicast access network 20 and multicast access network 22 are both multicast networks, and only support uni-directional downlinks. As a result, no feedback channels from a respective client 12, 14 or 16 to server 10 are available through multicast access networks 20 and 22. Clients 12, 14 and 16 may also have multiple network interfaces and be able to connect with a remote system via different types of communication networks. Specifically, Clients 12 and 14 may connect to a remote system through all three of the aforementioned access networks and thus have both unicast bi-directional and multicast uni-directional links, while Client 16 may only connect to a remote system through multicast access networks 20 and 22. As a result, client 16 only supports multicast uni-directional links.

A client may be a hardware device including for example, a computer or a mobile device capable of processing data files, running applications, and communicating with a server for instructions on transmitting and receiving data and processing of data.

Clients may require data content from a server or other content in order to be able to perform a specific function. For example, a client may be an audio/video device that must receive specific data from a server in order to properly process and display the data for a user. Thus, associations between clients and servers are required in order to facilitate transmission of data.

An example of the creation of an SCTP association is discussed in the following paragraphs. Client 12, as discussed, has a unicast uplink to server 10. This unicast uplink is used to make an SCTP connection request with server 10. This connection request leads to the potential creation of an SCTP association by using a standard four-way handshake procedure, and also described in further detail below.

An association may be defined as a connection between two endpoints. For example, an association between Client 12 and server 10 represents a communication path between the various IP addresses corresponding to Client 12 and the various IP addresses corresponding to server 10. Thus, an association represents a communication path between systems located at various IP addresses. An association also includes data representative of specific data packets which are to be delivered to a particular multicast path within a multicast network. Furthermore, an association also includes data used for indicating IP addresses of a client not associated with the server for transmission of data. This data is used by access networks in determining how data packets may be sent.

In order to initiate a request for communication with server 10, Client 12 transmits data representing an INIT chunk, as defined in SCTP, through a unicast uplink to server 10. The INIT chunk includes all IP addresses corresponding to the communication paths to which Client 12 is connected and includes data representing confirmation of multicast reception at client 12. Server 10 confirms which of the identified paths are available to server 10 for communication by including corresponding IP addresses in data representing an INIT ACK chunk. The data representing an INIT ACK, as defined in SCTP, chunk is transmitted by server 10 to Client 12 via an access network employing unicast communication, for example, unicast access network 18. Upon receipt of the data representing an INIT ACK chunk by Client 12, Client 12 generates data representing a TCB (Transmission Control Block) for the SCTP association at the client's side. The TCB includes information such as buffer size, maximum transmission unit (MTU) data and sequence number which will be used by the SCTP in order to identify associations. Client 12 then replies to server 10 with data representing a COOKIE ECHO chunk as defined in SCTP. When server 10 receives the data representing a COOKIE ECHO chunk, server 10 generates data representing its own TCB for the SCTP association at the server's side and replies with data representing a COOKIE ACK chunk, as defined in SCTP, sent to Client 12. This completes the four-way handshake procedure and forms an SCTP association between server 10 and Client 12 denoted as association A 24 in FIG. 1.

Another example of an SCTP association setup involves the same four-way handshake procedure described above, except server 10 initiates communication instead of Client 12. Server 10 periodically sends data representing an INIT chunk to Client 12 (or additional clients) through multicast network paths. The INIT chunk includes all IP addresses corresponding to the network paths to which server 10 is connected. For any client supporting a unicast uplink that is interested in having an SCTP connection with server 10, for example, Client 12, a reply including data representing an INIT ACK chunk is sent to server 10. Client 12 confirms multicast reception capability by including corresponding IP addresses for multicast communication in the data representing an INIT ACK chunk, as well as IP addresses for unicast communication used by Client 12. When server 10 receives the data representing an INIT ACK chunk, server 10 responds with data representing a COOKIE ECHO chunk that is sent to Client 12. Server 10 also generates data representing a TCB at the server side for the SCTP association with Client 12. When Client 12 receives the data representing a COOKIE ECHO chunk, Client 12 sends data representing a COOKIE ACK chunk to server 10 and generates data representing a TCB for the SCTP association at the client's side. An association of this type would also be denoted as association A 24 in FIG. 1.

If server 10 receives a subsequent SCTP association request from another client, for example, Client 14, the same procedures outlined above may be followed to set up additional SCTP associations, for example, association B 26 shown in FIG. 1. Multiple associations may be set up and these associations may belong to either a one-to-many SCTP socket or multiple one-to-one SCTP sockets. Specifically, multiple SCTP associations may share one SCTP transport port address, or alternatively, each association may have its own port address.

For clients without unicast feedback capability, but which only support multicast reception capability, such as Client 16, SCTP associations cannot be set up between the client and server 10. However, when data packets are delivered between server 10 and clients with SCTP associations, such as clients 12 and 14, these clients may specify that certain data packets to be sent to Client 16 through multicast access networks. In the present arrangement, Client 16 may be represented as a passive receiver that is only able to receive information from multicast networks. Specifically, Clients 12 and/or 14 may send a specific request to server 10 to send certain data packets to multicast access networks 20 and 22, to which clients 12, 14 and 16 have service subscriptions for requesting and receiving data. Client 16 is able to receive data from multicast access networks 20 and 22. The server 10, in response to the association data, decides the destination network to which each data packet is sent.

Once SCTP associations have been established between server 10 and its respective clients 12, 14 and 16, data exchange can begin between server 10 and the clients. As shown in FIG. 1, server 10 may establish multiple SCTP associations with multiple clients. Each association contains multicast paths which represent communication links between server 10 and clients 12, 14 and 16. As established, the SCTP associations allow Server 10 to use SCTP for sending data packets to each client using the corresponding associations. Because server 10 employs SCTP to communicate with clients 12 and 14, server 10 transmits multiple copies of the requested data packets to multicast access networks 20 and 22. However, this results in bandwidth inefficiency. In order to address this problem, the present arrangement leverages the multicast capability of a multicast network path by adding traffic optimizer modules 28 and 30 outside of the SCTP domain that minimizes the inefficiency associated with SCTP and takes advantage of the efficiency of multicast access networks 20 and 22. FIG. 1 shows two traffic optimizers 28 and 30 coupled with server 10. A respective traffic optimizer 28 for MBMS or 30 for DVB-H is connected between server 10 and a respective multicast access network 20 and 22 that is accessible by clients.

Traffic optimizer modules 28 and 30, as shown in FIG. 1, exist for the purpose of alleviating network traffic. In the present arrangement, traffic optimizers also serve to facilitate the transmission of data packets from a server to clients, using data associations, through multicast networks. Traffic optimizers also process data received from a server to ensure that the correct data is sent to an appropriate client in the most network resource efficient fashion. For example, if a certain client is a heavy bandwidth user or if there is heavy congestion in general within the network, then a traffic optimizer may process received data packets and also monitor network conditions to ensure that bandwidth is used and assigned accordingly.

Figure 2:
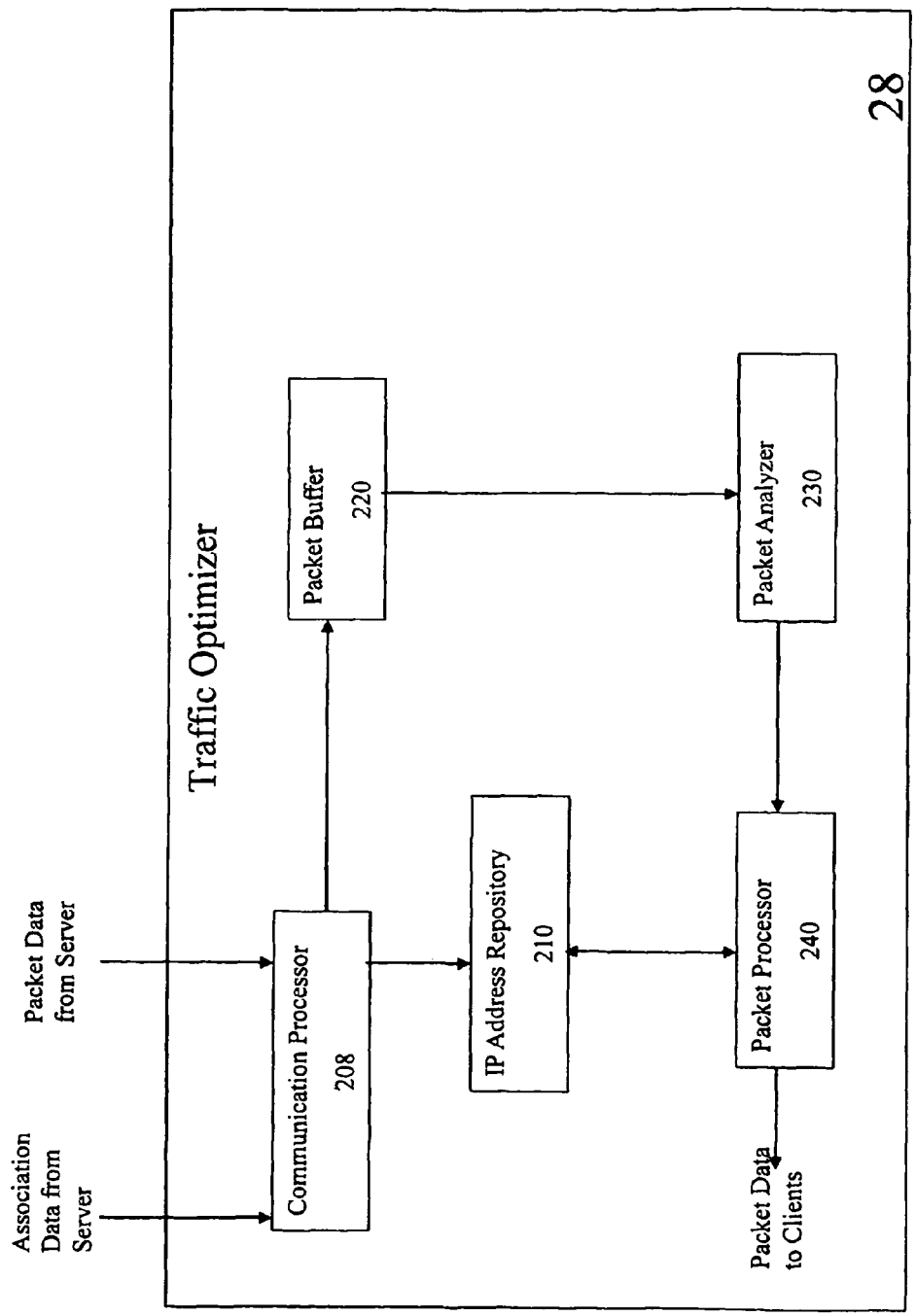
FIG. 2 depicts a traffic optimizer and how data is processed and transmitted according to the present arrangement.

FIG. 2 depicts a block diagram of the components within an exemplary traffic optimizer 28. A communication processor 208 receives data including association data and data packets intended for clients from server 10. Communication processor 208 is coupled to IP address repository 210 which may include a computerized storage medium that receives and stores association information including the IP addresses of server 10 and clients 12, 14 and 16 used for establishing communication paths. The association data representing IP addresses is stored in order to allow traffic optimizer 28 to be able to properly route data to the correct client IP addresses. IP address repository 210 provides the traffic optimizer 28 with knowledge of where data packets originate from and where they should be sent. Packet Buffer 220 is also coupled to communication processor 208 and receives data packets from server 10 and stores data packets until there are enough data packets to be analyzed. The received stored data packets correspond to content requested by any of clients 12 and 14. When a requisite number of data packets have been received, packet analyzer 230 coupled to packet buffer 220, parses the stored data packets from packer buffer 220 and analyzes the packets to identify the most complete set of data packets or find redundant copies of the same data. Packet analyzer 230 performs the analysis and identification by using a list of sequence numbers of data packets or a list of pointers associated with the data packets to compare with the sequence numbers of the stored data packets. These data packets represent data requested from sever 10 by clients 12 and/or 14.

Packet processor 240, coupled to packet analyzer 230, then receives the analyzed data packets from packet analyzer 230 as well as the resulting analysis. This allows packet processor 240 to send the most complete set of data packets to the clients or trim off redundant copies of the same data and only send one copy of data. All redundant copies are dropped and discarded, while one copy of data is kept for transmission to a multicast access network. As a result, less bandwidth is used because only one copy of data packets is sent instead of multiple data packets for multiple clients. In addition, in the event of network congestion or connection impairments, the most complete set of data packets is also sent to further ensure that there is minimal loss of data as well as efficiency in transmission. In order to ensure that data packets sent by packet processor 240 are sent to the correct clients, packet processor 240 is also coupled to IP address repository 210 which contains the IP addresses of the various associations between clients and server 10.

Specifically, packet processor 240 queries IP Address repository 210 to respond with data representing which particular client or access network IP addresses are to receive specific data packets. The following paragraphs provide further detail regarding the functions of traffic optimizer 28 in relation to the interconnection of traffic optimizer 28 with clients 12, 14, 16, server 10, and networks 18, 20 and 22 depicted in FIG. 1.

Figure 3:
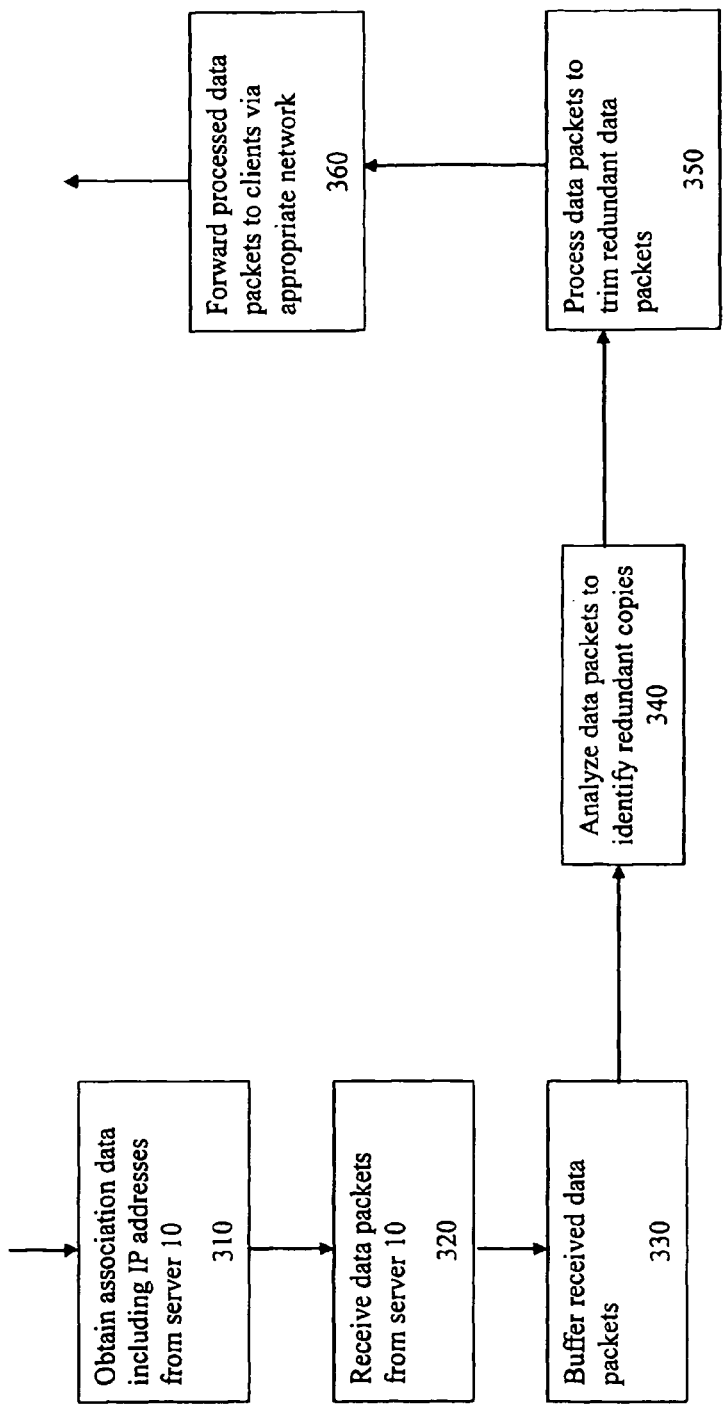
FIG. 3 depicts a flow diagram illustrating a process used by a traffic optimizer to improve efficiency in data transmission according to the present arrangement.

FIG. 3 depicts a flowchart of the steps taken by traffic optimizer 28 to improve the efficiency of the transmission of data packets from server 10 to its respective clients. The process begins at step 310, where traffic optimizer 28 obtains the IP addresses from a particular client/server association identifying where and how data packets are to be sent. In step 320, traffic optimizer 28 receives data packets from server 10. The received data packets are all linked to particular destination IP addresses of clients and corresponding association information indicating the destination of the data packets. At step 330, traffic optimizer 28 buffers the received packets sent by server 10. Because server 10 must send the same data packets to all clients in a multicast network, the data packets that traffic optimizer 28 receives from server 10 corresponding to individual associations should be the same. As a result, at step 340, traffic optimizer 28 may analyze the data packets to identify redundant copies of the same data. Then, at step 350, traffic optimizer 28 may process the analyzed data in order to trim off redundant copies of the same data so that only one copy of data packets is forwarded to a destination network. Step 360 involves traffic optimizer 28 delivering the processed data including one copy of data packets along with association data including IP addresses of the destination clients. This data is forwarded to a destination network, which can include one or all or networks 18, 20, and 22. The destination network is ultimately responsible for sending the data packets to particular clients based on association data including destination IP addresses of clients.

The steps of traffic optimizer 28 may alternatively be run as a process within server 10, for example, at network layer. Specifically, the functionalities of traffic optimizer 28 may be implemented within server 10 instead of as a stand alone module. Traffic optimizer 30, an additional traffic optimizer shown in FIG. 1, which is responsible for communication across DVB-H network 22, operates similarly to traffic optimizer 28 described above.

Clients 12 and 14 may receive common data packets delivered through a multicast network path. For clients with additional unicast paths as shown in FIG. 1, specifically clients 12 and 14, these clients may be able to receive extra data packets from server 10 through unicast downlinks shown in FIG. 1. Each client with unicast paths may make specific requests to server 10 to have different data packets sent through its unicast downlink instead of through multicast. Extra data packets may be sent through a unicast downlink for a variety of reasons. Certain data may be specific to a particular client or poor multicast network conditions may require that certain data be sent through unicast.

Clients 12 and 14 are also able to send a Selective Acknowledgment (SACK) on behalf of all paths in an association, including multicast paths, to server 10 through a unicast uplink. A SACK is an acknowledgement that packets have been received. When a client sends a SACK, it acknowledges that the IP addresses corresponding to a particular association are serviceable and may participate in sending and receiving data.

Because clients may experience different reception conditions in a multicast network, the amount of data packets lost is also reported within a SACK. Thus, a SACK also serves as feedback from multiple SCTP associations. The amount of packets lost will differ between different IP addresses for different associations since each association may experience different levels of reception impairment. Reception impairment is especially prevalent in wireless communication networks where data corruption is commonplace due to poor data reception conditions. As a result, server 10 may retransmit data packets unsuccessfully sent through multicast links through unicast downlinks to individual clients supporting unicast to facilitate connection and data packet recovery. This provides the system with a safety mechanism for allowing clients to receive intended data even when multicast links are experiencing delay or if a multicast link is not a viable option. If a client detects that data is lost within a multicast link, the client can send feedback to server 10 using its unicast link to request that the server resent the missing data through the unicast link.

Figure 4:
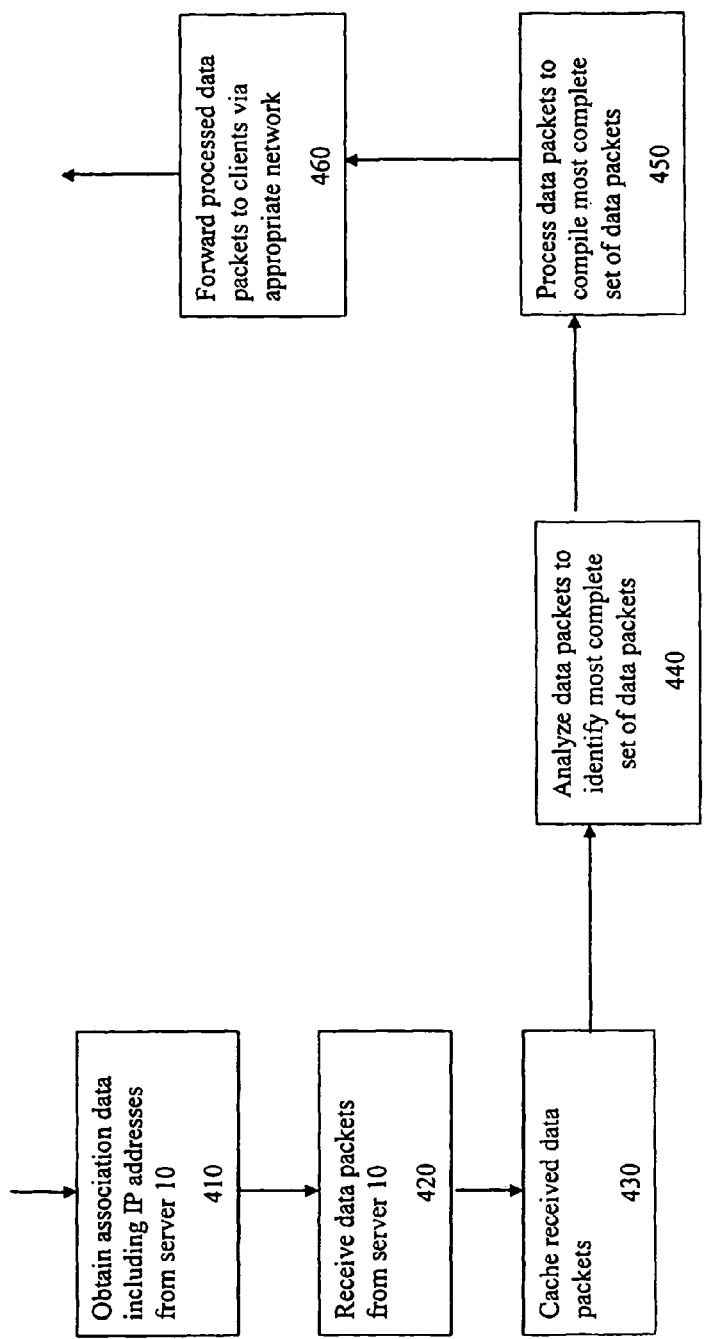
FIG. 4 depicts a flow diagram illustrating another process used by a traffic optimizer to improve efficiency in data transmission according to the present arrangement.

However, due to a SCTP congestion control mechanism, server 10 may send data packets at different data rates for different associations at certain times. FIG. 4 depicts a flowchart of steps taken by a traffic optimizer to optimize data packet transmission when data packets are sent by a server at different rates for different IP addresses corresponding to different associations. As a result, different data packets for multiple associations may reach traffic optimizer 28 at different times. Thus, traffic optimizer 28 sorts through the data packets to ensure that particular data packets reach the correct client and that these data packets are as complete as possible. The process begins at step 410, where traffic optimizer 28 obtains the destination IP addresses from a corresponding association for data packets to be sent through an access network. At step 420, the traffic optimizer 28 receives data packets from server 10 with intended destinations to various clients based on IP addresses from their corresponding associations. At step 430, traffic optimizer 28 caches the received data packets. Then, at step 440, the cached data packets are analyzed to find the most complete set of packets corresponding to the content requested by a respective client. Incomplete sets of data packets may be analyzed and then compiled to form a substantially complete or complete set of data packets at step 450. Sequence numbers of data packets are analyzed to determine if a set of data packets is complete or missing certain portions to compare with sequence numbers of stored data packets. At step 460, the substantially complete or complete set of packets is forwarded to a destination multicast network for transmission to particular clients.

The paragraphs above describing the present arrangement are also applicable to a system using SCTP-PR. Furthermore, in a system using SCTP-PR, server 10 is able skip transmission of certain data packets through a multicast link if a particular IP address of an association suffers a large amount of delay compared to other IP addresses of the same association. This allows a lagging multicast link for a particular IP address of an association to catch up to data packets which have already been sent to other IP addresses. When a particular link suffers greater loss compared to other links, the data packets transmitted through the links with a better connection suffer delays in data transmission. Since not all data packets are required to be received completely by a client, server 10 is able to determine which data packets are being sent through links that are lagging and appropriately skip the transmission of those data packets. This process is transparent to clients. A client may also report excessive packet loss in a particular multicast link. Upon receipt of data representing excessive packet loss, server 10 may remove the IP address using a particular multicast link from its corresponding association to prevent delay of transmission of data to other IP addresses of clients.

Although the arrangement has been described in terms of exemplary embodiments, it is not limited thereto. Rather, the appended claims should be construed broadly to include other variants and embodiments of the arrangement which may be made by those skilled in the art without departing from the scope and range of equivalents of the arrangement. This disclosure is intended to cover any adaptations or variations of the embodiments discussed herein.

The invention claimed is:

1. A traffic optimizer facilitating communication of data packets between a server and at least one of a plurality of clients through a multicast network, the traffic optimizer comprising:
   a communication processor that receives association data and data packets having a unicast stream control transmission protocol from the server, the association data including an IP address of the server and IP addresses of the at least one of a plurality of clients available for communication, wherein the unicast stream control transmission protocol is stream control transmission protocol-partial reliability;
   a packet analyzer that identifies a most complete set of packets to be delivered to the at least one of the plurality of clients and finding redundant copies of the received data packets;
   a packet processor that processes the received data packets by trimming off the redundant copies of the received data packets, compiling a complete set of received data packets, and forwarding the processed data packets to the at least one of the plurality of clients at respective ones of the received IP addresses through the multicast network.

2. The traffic optimizer of claim 1, further comprising an IP address repository that stores the association data for access by the packet processor to forward the processed data packets.

3. The traffic optimizer of claim 1, further comprising a packet buffer that buffers the received data packets, before the data packets are processed, until an expected number of data packets are received.

4. The traffic optimizer of claim 3, wherein the_packet analyzer analyzes the buffered data packets to determine a type of processing required.

5. The traffic optimizer of claim 1, wherein a client sends an acknowledgement to the server indicating proper receipt of data packets from the multicast network and information including whether packets are delayed.

6. The traffic optimizer of claim 5, wherein the traffic optimizer receives instructions from the server to skip transmission of certain data packets to a particular IP address of an association based upon an indication that packets are delayed after a client has received the data packets through the multicast network.

7. The traffic optimizer of claim 5, wherein the traffic optimizer receives instructions from the server to remove an IP address from an association if it is determined that a particular IP address experiences packet delay after the client has received data packets through the multicast network.

8. The traffic optimizer of claim 1, wherein the traffic optimizer operates without changes to the unicast stream control transmission protocol.

9. A method facilitating communication of data packets using a unicast stream control transmission protocol between a server and at least one of a plurality of clients through a multicast network with a traffic optimizer, the method comprising:
   establishing a stream control transmission protocol communication between the server and the at least one of the plurality of clients;
   receiving, by the traffic optimizer, association data and data packets using the unicast stream control transmission protocol from the server, the association data including an IP address of the server and IP addresses of the at least one of a plurality of clients available for communication, wherein the unicast stream control transmission protocol is stream control transmission protocol-partial reliability;
   analyzing, by the traffic optimizer, the received data packets to identify a most complete set of packets to be delivered to at the least one of the plurality of clients and to find redundant copies of the received data packets;
   processing, by the traffic optimizer, the received data packets to trim off the redundant copies of the received data packets and compile a complete set of the received data packets; and
   forwarding the processed data packets to the at least one of the plurality of clients at respective ones of the received IP addresses through the multicast network.

10. The method of claim 9, further comprising buffering the received data packets until an expected number of data packets are received.

11. The method of claim 10, further comprising analyzing the buffered data packets to determine the type of processing required.

12. The method of claim 9, further comprising sending, with a client, an acknowledgement to the server indicating proper receipt of data packets from the multicast network and information including whether data packets are delayed.

13. The method of claim 12, further comprising skipping the transmission of certain data packets for a particular IP address of an association based upon an indication that packets are delayed after a client has received the data packets through the multicast network.

14. The method of claim 12, further comprising removing an IP address from an association if it is determined that a particular IP address experiences packet delay after the client has received data packets through the multicast network.

15. The method of claim 9, wherein the apparatus operates without explicit changes to the unicast stream control transmission protocol.

\* \* \* \* \*